(12) United States Patent
He

(10) Patent No.: US 12,393,384 B2
(45) Date of Patent: Aug. 19, 2025

(54) DISPLAY PANEL AND DRIVING METHOD THEREOF

(71) Applicant: TCL CHINA STAR OPTOELECTRONICS TECHNOLOGY CO., LTD., Shenzhen (CN)

(72) Inventor: Guanxian He, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 67 days.

(21) Appl. No.: 18/198,021

(22) Filed: May 16, 2023

(65) Prior Publication Data
US 2024/0220173 A1    Jul. 4, 2024

(30) Foreign Application Priority Data

Dec. 29, 2022 (CN) .......................... 202211711121.8

(51) Int. Cl.
*G06F 3/14* (2006.01)
(52) U.S. Cl.
CPC .............. *G06F 3/14* (2013.01); *G06F 3/1438* (2013.01)
(58) Field of Classification Search
CPC .................................. G06F 3/14; G06F 3/1438
See application file for complete search history.

(56) References Cited

U.S. PATENT DOCUMENTS

2015/0294614 A1    10/2015  Duan et al.
2016/0232852 A1*    8/2016  An ........................ G09G 3/3291

FOREIGN PATENT DOCUMENTS

| CN | 108257555 A | 7/2018 |
|----|-------------|--------|
| CN | 109064987 A | 12/2018 |
| CN | 110415661 A | 11/2019 |
| CN | 111554245 A | 8/2020 |

OTHER PUBLICATIONS

Chinese Office Action issued in corresponding Chinese Patent Application No. 202211711121.8 dated Jun. 28, 2025, pp. 1-12, 26pp.

* cited by examiner

*Primary Examiner* — Adam R. Giesy
(74) *Attorney, Agent, or Firm* — The Roy Gross Law Firm, LLC; Roy D. Gross

(57) ABSTRACT

A driving method for a display method includes: processing a first display data of a first display portion according to a first combined statistical information to obtain a first target display data used to drive the first display portion to illuminate; and processing a second display data of a second display portion according to a second combined statistical information to obtain a second target display data used to drive the second display portion to illuminate. The first combined statistical information is obtained by combining a first statistical information corresponding to the first display data with a second statistical information corresponding to the second display portion, and the second combined statistical information is obtained by combining the first statistical information corresponding to the first display data with the second statistical information corresponding to the second display portion.

5 Claims, 5 Drawing Sheets

DISPLAY PANEL AND DRIVING METHOD THEREOF

CROSS REFERENCE TO RELATED APPLICATION

This application claims priority to China Patent Application No. 202211711121.8, filed on Dec. 29, 2022, which is incorporated herein by reference in its entirety.

TECHNICAL FIELD

The present invention relates to display technologies, and more particularly to a display panel and a driving method thereof.

BACKGROUND

As the size and resolution of display panels increase, the requirements on timing controllers are getting higher and higher, and it is difficult to meet production requirements when a single timing controller is used. Therefore, timing controllers on two chips can be used to drive a left-half screen and a right-half screen separately.

For the dual-chip timing controllers that drive the left-half screen and the right-half screen respectively, each timing controller can only obtain and use a corresponding image algorithm to process the display data of a corresponding half screen, so that a half screen displays a corresponding picture and the pictures on two halves of the screen jointly form an entire picture. However, since the entire picture formed by the respective pictures which are presented by the dual-chip timing controllers adopting the respective image algorithms provides little unity, this results in an obvious boundary at the junction of the left and right half screens, reducing the image quality.

Therefore, the existing display panels using the dual-chip timing controllers to drive the left and right half screens respectively have the afore-described problem, and it needs to be improved urgently.

SUMMARY

The embodiments of the present invention provide a display panel and a driving method thereof, for solving the problem of obvious boundary caused by the existing display panels using the dual-chip timing controllers to drive the left and right half screens respectively.

The embodiment of the present invention provides a display panel driving method, for driving a display panel, the display panel including a first display portion, a second display portion, a first timing controller electrically connected to the first display portion, and a second timing controller electrically connected to the second display portion, the method including:

by the first timing controller, processing a first display data of the first display portion according to a first combined statistical information to obtain a first target display data, wherein the first combined statistical information is obtained by combining a first statistical information corresponding to the first display data with a second statistical information corresponding to the second display portion;

by the first timing controller, driving the first display portion to display a picture according to the first target display data;

by the second timing controller, processing a second display data of the second display portion according to a second combined statistical information to obtain a second target display data, wherein the second combined statistical information is obtained by combining the first statistical information corresponding to the first display data with the second statistical information corresponding to the second display portion; and by the second timing controller, driving the second display portion to display a picture according to the second target display data.

In an embodiment, the first display portion and the second display portion are arranged adjacent to each other along a row direction, and the first display portion and the second display portion include a plurality of first subpixels and a plurality of second subpixels arranged in a same row, respectively, wherein the first display data includes a first row display data corresponding to the plurality of first subpixels, and the second display data includes a second row display data corresponding to the plurality of second subpixels, wherein the first statistical information includes a first row statistical information corresponding to the first row display data, and the second statistical information includes a second row statistical information corresponding to the second row display data.

In an embodiment, before the processing, by the first timing controller, the first display data of the first display portion according to the first combined statistical information to obtain the first target display data, the method includes:

by the first timing controller, buffering the first display data for the time corresponding to N rows, where N is a positive integer;

wherein before the processing, by the second timing controller, the second display data of the second display portion according to the second combined statistical information to obtain the second target display data, the method includes:

by the second timing controller, buffering the second display data for the time corresponding to N rows.

In an embodiment, before the processing, by the first timing controller, the first display data of the first display portion according to the first combined statistical information to obtain the first target display data, the method includes:

by the first timing controller, obtaining and transmitting the first row statistical information to the second timing controller within the time corresponding to N rows; and by the first timing controller, receiving the second row statistical information transmitted by the second timing controller within the time corresponding to N rows, wherein before the processing, by the second timing controller, the second display data of the second display portion according to the second combined statistical information to obtain the second target display data, the method includes:

by the second timing controller, obtaining and transmitting the second row statistical information to the first timing controller within the time corresponding to N rows; and by the second timing controller, receiving the first row statistical information transmitted by the first timing controller within the time corresponding to N rows.

In an embodiment, the first display portion and the second display portion include a plurality of first subpixels and a plurality of second subpixels arranged in a same row, respectively, wherein the first display data includes a first current frame display data corresponding to the plurality of first subpixels, and the second display data includes a second current frame display data corresponding to the plurality of second subpixels, wherein the first statistical information includes a first previous frame statistical information, the first previous frame statistical information corresponds to the first previous frame statistical information of a first previous frame display data of the plurality of first subpixels, the second statistical information includes a second previous frame statistical information, and the second previous frame statistical information corresponds to the second previous frame statistical information of a second previous frame display data of the plurality of second subpixels.

In an embodiment, there is a same blanking period between a first previous frame and a first current frame and between a second previous frame and a second current frame, the first previous frame and the first current frame correspond to the first previous frame display data and the first current frame display data, respectively, and the second previous frame and the second current frame correspond to the second previous frame display data and the second current frame display data, respectively, wherein the processing, by the first timing controller, the first display data of the first display portion according to the first combined statistical information to obtain the first target display data is finished after the blanking period.

wherein the processing, by the second timing controller, the second display data of the second display portion according to the second combined statistical information to obtain the second target display data is finished after the blanking period.

In an embodiment, before the processing, by the first timing controller, the first display data of the first display portion according to the first combined statistical information to obtain the first target display data, the method includes:

by the first timing controller, obtaining the first previous frame statistical information within the blanking period and transmitting the first previous frame statistical information to the second timing controller; and by the first timing controller, receiving the second previous frame statistical information transmitted by the second timing controller within the blanking period;

wherein before the processing, by the second timing controller, the second display data of the second display portion according to the second combined statistical information to obtain the second target display data, the method includes:

by the second timing controller, obtaining the second previous frame statistical information within the blanking period and transmitting the second previous frame statistical information to the first timing controller; and by the second timing controller, receiving the first previous frame statistical information transmitted by the first timing controller within the blanking period.

The embodiment of the present invention further provides a display panel, including a first display portion, a second display portion, a first timing controller electrically connected to the first display portion, and a second timing controller electrically connected to the second display portion, the first timing controller including:

a first processing module, for processing a first display data of the first display portion according to a first combined statistical information to obtain a first target display data, wherein the first combined statistical information is obtained by combining a first statistical information corresponding to the first display data with a second statistical information corresponding to the second display portion; and a first driving module, for driving the first display portion to display a picture according to the first target display data;

the second timing controller including:

a second processing module, for processing a second display data of the second display portion according to a second combined statistical information to obtain a second target display data, wherein the second combined statistical information is obtained by combining the first statistical information corresponding to the first display data with the second statistical information corresponding to the second display portion; and a second driving module, for driving the second display portion to display a picture according to the second target display data.

In an embodiment, the first display portion and the second display portion are arranged adjacent to each other along a row direction, and the first display portion and the second display portion include a plurality of first subpixels and a plurality of second subpixels arranged in a same row, respectively, wherein the first display data includes a first row display data corresponding to the plurality of first subpixels, and the second display data includes a second row display data corresponding to the plurality of second subpixels, wherein the first timing controller further includes a first row buffering module for buffering the first row display data, and the second timing controller further includes a second row buffering module for buffering the second row display data.

In an embodiment, the first timing controller includes a first statistical transmitting module and a first row statistical receiving module, and the second timing controller includes a second statistical transmitting module and a second row statistical receiving module;

wherein the first statistical transmitting module is used to transmit the first statistical information to the second row statistical receiving module, and the second statistical transmitting module is used to transmit the second statistical information to the first row statistical receiving module.

In an embodiment, the first timing controller further includes:

a first row combining module, for combining the first statistical information and the second statistical information to obtain the first combined statistical information;

wherein the second timing controller further includes:

a second row combining module, for combining the first statistical information and the second statistical information to obtain the second combined statistical information.

The present invention provides a display panel and a driving method thereof. By the first combined statistical information obtained by combining the first statistical information corresponding to the first display data with the second statistical information corresponding to the second display portion, the first display data of the first display portion is processed to obtain the first target display data used to drive the first display portion, and by the second combined statistical information obtained by combining the first statistical information corresponding to the first display data with the second statistical information corresponding to the second display portion, the second display data of the second display portion is processed to obtain the second target display data used to drive the second display portion. In this way, the displaying made by the first display portion and the displaying made by the second display portion take all the first statistical information and the second statistical information into consideration, so that the two displayed pictures have a certain correlation with each other, thereby increasing the consistency between the pictures displayed by the first display portion and the second display portion.

BRIEF DESCRIPTION OF THE DRAWINGS

The present invention will be further illustrated below by referring to appending figures. It should be noted that the appending figures described below are only some embodiments used to illustrate the present invention, and those of ordinary skill in the art can further obtain other figures according to these figures without making any inventive effort.

DETAILED DESCRIPTION

The technical solutions in the embodiments of the present invention will be clearly and completely described below with reference to accompanying drawings of the embodiments of the present invention. Obviously, the described embodiments are merely a part of embodiments of the present invention and are not all of the embodiments. Based on the embodiments of the present invention, other embodiments obtained by those of ordinary skill in the art without making any inventive effort are within the scope the present invention seeks to be protected.

In the present invention, the terms "first", "second", and so on are intended to distinguish between different objects rather than to indicate a specific order. Moreover, the terms "include", "have" and any other variants mean to cover the non-exclusive inclusion. For example, in the context of a process, method, system, product or device that includes a series of steps or modules, the process, method, system, product or device is not necessarily limited to the listed steps or modules, instead, optionally includes other steps or modules not specified, or may optionally include inherent steps or modules of the process, method, product, or device.

The term "embodiment" or "implementation" referred to herein means that a particular feature, structure, or feature described in conjunction with the implementation may be contained in at least one implementation of the present invention. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The embodiments of the present invention provide a display panel driving method for driving a display panel, and the display panel driving method includes, but is not limited to, the following embodiments and any combination of the following embodiments.

Figure 1:
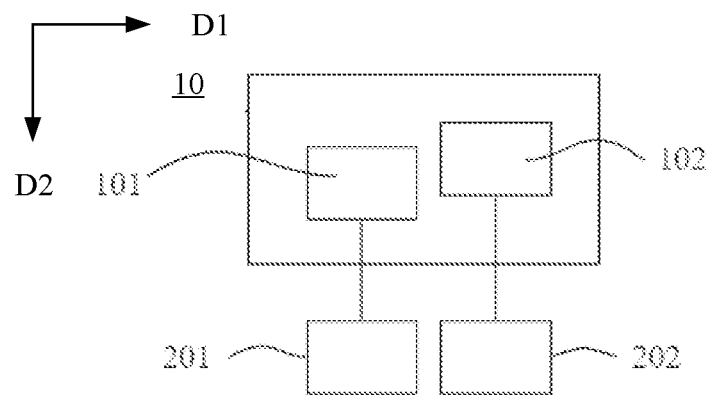
FIG. 1 and FIG. 2 are structural block diagrams illustrating two types of display panels provided in the embodiments of the present invention.
Figure 2:
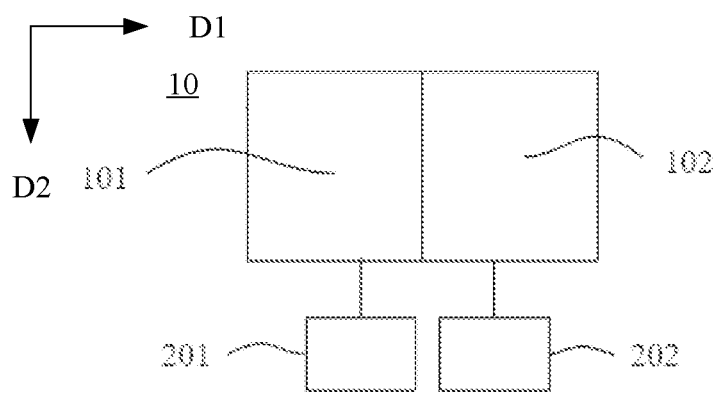
Figure 3:
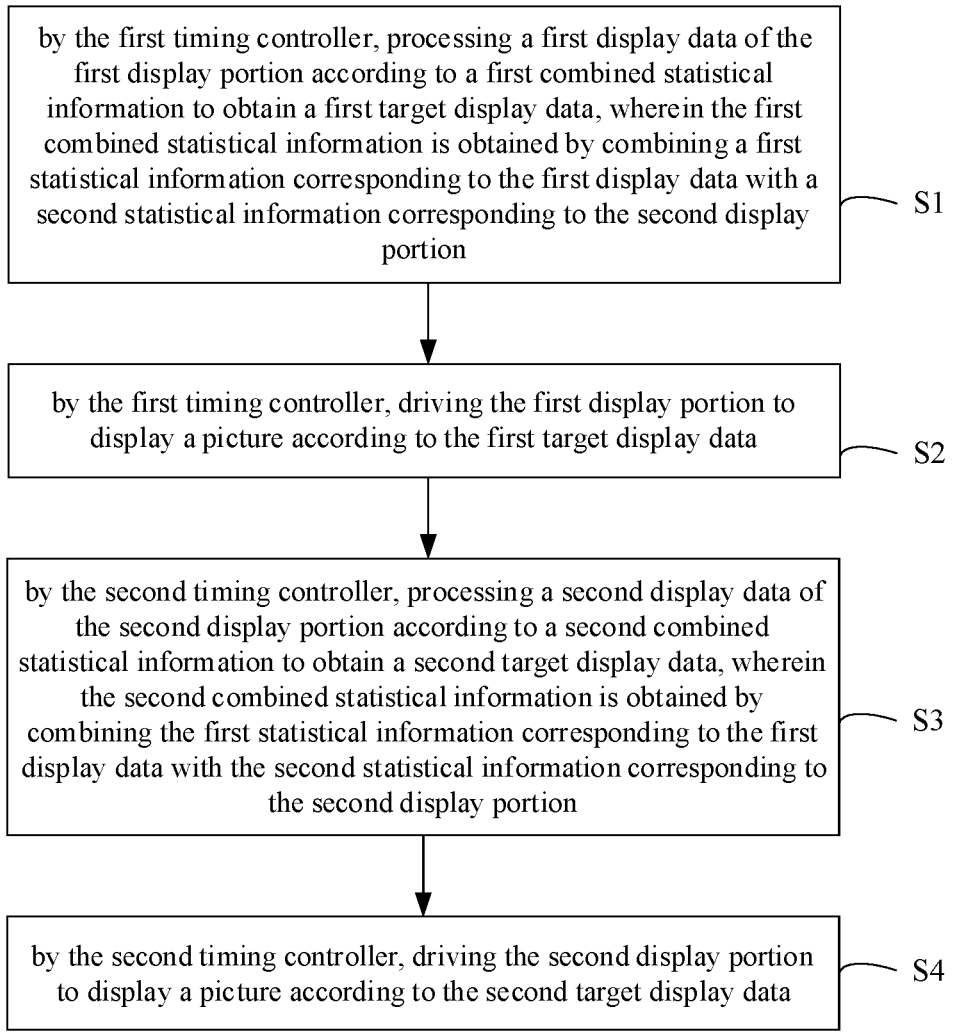
FIGS. 3 to 5 are several flowcharts of a driving method of a display panel provided in the embodiments of the present invention.

In an embodiment, as shown in FIG. 1 and FIG. 2, the display panel 10 includes a first display portion 101, a second display portion 102, and a first timing controller 201 and a second timing controller 202 electrically connected to the first display portion 101 and the second display portion 102, respectively, that is, the first timing controller 201 is electrically connected to the first display portion 101, and the second timing controller 202 is electrically connected to the second display portion 102. As shown in FIG. 3, the method may include, but is not limited to, the following steps.

S1: by the first timing controller, processing a first display data of the first display portion according to a first combined statistical information to obtain a first target display data, wherein the first combined statistical information is obtained by combining a first statistical information corresponding to the first display data with a second statistical information corresponding to the second display portion.

As shown in FIG. 1 and FIG. 2, the position and size of the first display portion 101 and the second display portion 102 are not limited in this embodiment, and it is intended to illustrate that they are two different display portions in the display panel 10. Also, the first display portion 101 and the second display portion 102 are electrically connected to the first timing controller 201 and the second timing controller 202, respectively, so as to be driven by the first timing controller 201 and the second timing controller 202 respectively, to emit light rays. For example, both the first timing controller 201 and the second timing controller 202 may be timing controllers that support a 4K resolution and a refresh rate of 60 Hz, so as to drive a display portion with 4K resolution and 60 Hz refresh rate, which is formed by the first display portion 101 and the second display portion 102. For another example, both the first timing controller 201 and the second timing controller 202 may be timing controllers that support a 8K resolution and a refresh rate of 60 Hz, so as to drive a display portion with 8K resolution and 120 Hz refresh rate, which is formed by the first display portion 101 and the second display portion 102.

In particular, as shown in FIG. 2, the first display portion 101 and the second display portion 102 may be a left-half display portion and a right-half display portion of the display panel 10, respectively.

It should be noted that for the first timing controller 201 and the second timing controller 202 that drive the first display portion 101 and the second display portion 102 respectively, if the first timing controller 201 or the second timing controller 202 can only obtain and use the statistical information corresponding to the first display portion 101 or the second display portion 102 to drive the first display portion 101 or the second display portion 102 to display a picture, this will eventually lead to poor consistency between the picture displayed by the first display portion 101 and the picture displayed by the second display portion 102 because it is unable to consider each other's influence by each other's display condition, thereby reducing the display quality.

Specifically, in this embodiment, the processing of the first display data of the first display portion 101 by the first timing controller 201 is based on the first combined statistical information, and the first combined statistical information is obtained by combining the first statistical information corresponding to the first display data with the second statistical information corresponding to the second display portion 102, that is, it can be considered that the first target display data obtained by processing the first display data by the first timing controller 201 takes into account the second statistical information corresponding to the second display portion 102.

S2: by the first timing controller, driving the first display portion to display a picture according to the first target display data.

Following the above context, in this embodiment, the first display portion 101 is driven to display a picture according to the first target display data. That is, in addition to its corresponding first statistical information, the second statistical information corresponding to the second display portion 102 is also taken into account when the first display portion 101 displays a picture. That is, the first target display data used to drive the first display portion 101 to display a picture takes all the first statistical information and the second statistical information into consideration. The displaying made by the first display portion 101 may have a certain correlation with the displaying made by the second display portion 102, thereby increasing the consistency between the picture displayed by the first display portion 101 and the picture displayed by the second display portion 102.

S3: by the second timing controller, processing a second display data of the second display portion according to a second combined statistical information to obtain a second target display data, wherein the second combined statistical information is obtained by combining the first statistical information corresponding to the first display data with the second statistical information corresponding to the second display portion.

Likewise, with reference to the above context regarding Step S1, in addition to the first statistical information corresponding to the first display portion 101, the second target display data obtained by processing the second display data by the second timing controller 202 also takes into account the second statistical information corresponding to the second display portion 102.

The way to realize the "combination" in Step S1 may be the same as or different from the way to realize the "combination" in Step S3, so that the first combined statistical information may be the same as or different from the second combined statistical information. Further, the weight of the first statistical information in the first combined statistical information may be greater than or equal to the weight of the second statistical information in the first combined statistical information, so that the picture displayed by the first display portion 101 mainly considers the first statistical information, and the weight of the second statistical information in the second combined statistical information may be greater than or equal to the weight of the first statistical information in the second combined statistical information, so that the picture displayed by the second display portion 102 mainly considers the second statistical information.

Specifically, both the first statistical information and the second statistical information may include, but are not limited to, a distribution of gray scale values, a change of gray scale values, a distribution of polarity voltages, a change of polarity voltages, a specific combination of gray scale values of a plurality of subpixels. The distribution of gray scale values may mean a distribution of subpixels with large gray scale values, small gray scale values or medium gray scale values in the corresponding display portion. The change of gray scale values may mean a variation trend of gray scale values of a plurality of subpixels in the corresponding display portion along at least one direction. The distribution of polarity voltages may mean a distribution of the polarity of voltages of a plurality of subpixels that adopt polarity inversion in the corresponding display portion. The change of polarity voltages may mean a variation trend of the polarity of voltages of a plurality of subpixels in the corresponding display portion along at least one direction. The specific combination of gray scale values may mean whether a plurality of corresponding gray scale values of a plurality of subpixels in the corresponding display portion are arranged into at least a specific combination of gray scale values.

S4: by the second timing controller, driving the second display portion to display a picture according to the second target display data.

Likewise, with reference to the above context regarding Step S3, in this embodiment, the second display portion 102 is driven to display a picture according to the second target display data. That is, in addition to its corresponding second statistical information, the first statistical information corresponding to the first display portion 101 is also taken into account when the second display portion 102 displays a picture. That is, the second target display data used to drive the second display portion 102 to display a picture also takes all the first statistical information and the second statistical information into consideration. The displaying made by the second display portion 102 may have a certain correlation with the displaying made by the first display portion 101, thereby increasing the consistency between the picture displayed by the first display portion 101 and the picture displayed by the second display portion 102.

It should be noted that in this embodiment, the order to execute the above steps is not limited to an order from Step S1 to Step S4 as long as it satisfies that Step S2 is executed after step S1 and Step S4 is executed after Step S3.

In an embodiment, as shown in FIGS. 1 and 2, the first display portion 101 and the second display portion 102 are arranged adjacent to each other along a row direction D1. The first display portion 101 and the second display portion 102 include a plurality of first subpixels 01 and a plurality of second subpixels 02 arranged in a same row, respectively. The first display data includes a first row display data corresponding to the plurality of first subpixels 01, and the second display data includes a second row display data corresponding to the plurality of second subpixels 02. The first statistical information includes a first row statistical information corresponding to the first row display data, and the second statistical information includes a second row statistical information corresponding to the second row display data.

Specifically, the display panel 10 may include a plurality of subpixels arranged in an array, that is, the plurality of subpixels may be arranged along a row direction D1 and a column direction D2. In this embodiment, it is limited that the first display portion 101 and the second display portion 102 are arranged adjacent to each other along the row direction D1. For example, the first timing controller 201 and the second timing controller 202 can control the consecutive subpixels from the n-th row to the (n+j)-th row in the m-th column to the (m+i)-th column and the consecutive subpixels from the n-th row to the (n+j)-th row in the (m+i+1)-th column to the (m+j)-th column, respectively, where m, i, n and j are positive integers. Further, the first display portion 101 and the second display portion 102 may be a left-half display portion and a right-half display portion of the display panel 10, respectively (as shown in FIG. 2).

For any row of subpixels, it can be considered that it includes a plurality of first subpixels 01 belonging to the first display portion 101 and a plurality of second subpixels 02 belonging to the second display portion 102. With reference to above context, the plurality of first subpixels 01 can be driven by a first target row display data to display an image, and the first target row display data is obtained by processing the first row display data using the first combined statistical information, wherein the first combined statistical information is obtained by combining a first row statistical information corresponding to the first row display data with a second row statistical information corresponding to the second row display data. Likewise, the plurality of second subpixel 02 can be driven by a second target row display data to display an image, and the second target row display data is obtained by processing the second row display data using the second combined statistical information, wherein the second combined statistical information is obtained by combining the first row statistical information corresponding to the first row display data with the second row statistical information corresponding to the second row display data.

Therefore, with reference to above context, in this embodiment, the first target row display data used to drive the plurality of first subpixels 01 to display an image and the second target row display data used to drive the plurality of second subpixels 02 to display an image all have taken into account the first row statistical information and the second row statistical information, that is, the displaying made by the second display portion 102 may have a certain correlation with the displaying made by the first display portion 101, thereby increasing the consistency between the picture displayed by the first display portion 101 and the picture displayed by the second display portion 102.

Figure 4:
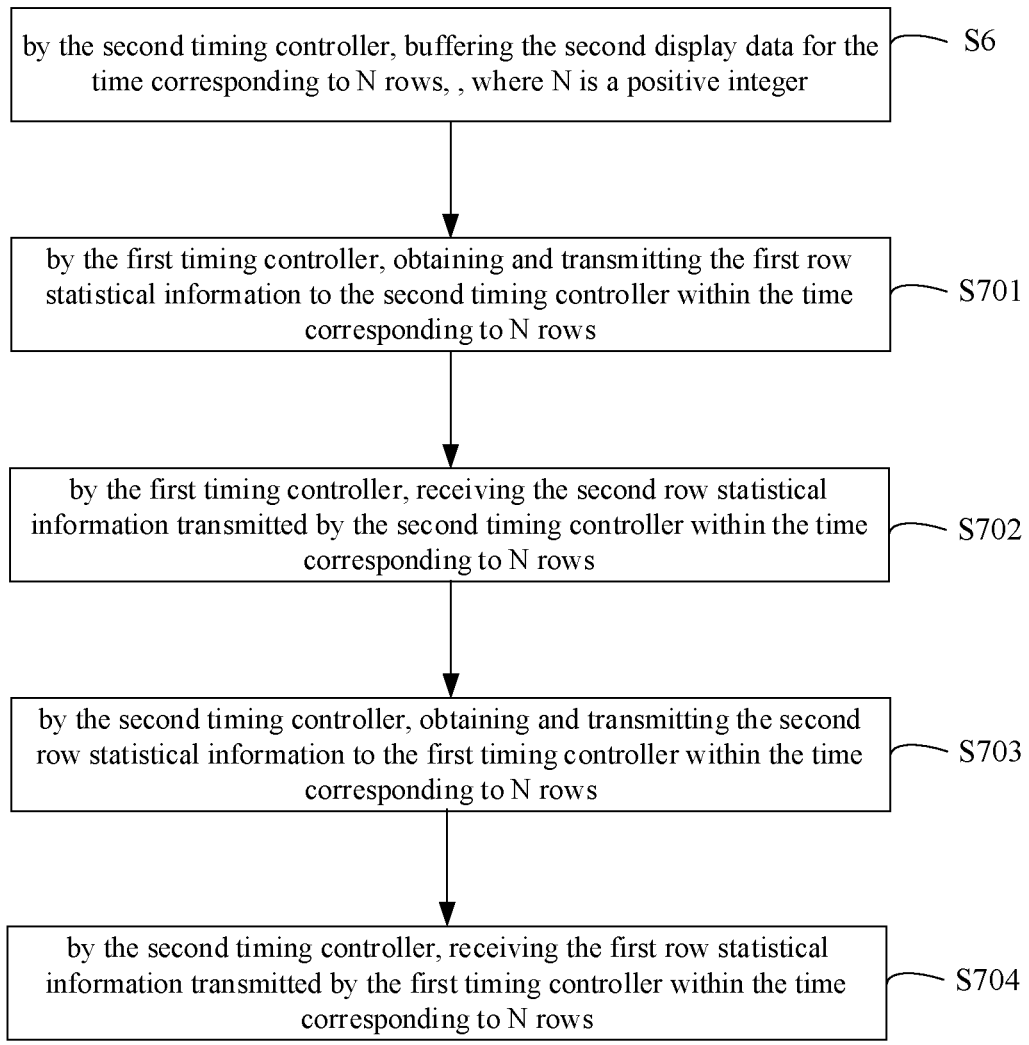

In an embodiment, as shown in FIG. 4, before Step S1, the method may include, but is not limited to, the following step S5: by the first timing controller, buffering the first display data for the time corresponding to N rows, where N is a positive integer.

It can be understood that with reference to the above context regarding Steps S1 to S4, since the first display data is needed in Step S1, and further the determination on the first combined statistical information in Step S1 also needs a certain amount of time, that is, it needs to be obtained by combining the first statistical information corresponding to the first display data with the second statistical information corresponding to the second display portion 102. Accordingly, in this embodiment, the length of time the first timing controller 201 buffers the first display data may be limited to the time corresponding to N rows, after which the first display data is released for executing Step S1 to process the first display data of the first display portion 101 according to the first combined statistical information.

Based on Step S5 and relevant context above, Step S1 can be completed after the time corresponding to N rows, that is, the first display data is released after the time corresponding to N rows so as to be processed by the first combined statistical information to obtain the first target display data.

Likewise, as shown in FIG. 4, before Step S3, the method may include, but is not limited to, the following step S6: by the second timing controller, buffering the second display data for the time corresponding to N rows.

Similarly, with reference to the above context regarding Steps S1 to S4, since the second display data is needed in Step S3, and further the determination on the second combined statistical information in Step S3 also needs a certain amount of time. Accordingly, in this embodiment, the length of time the second timing controller 202 buffers the second display data may be limited to the time corresponding to N rows, after which the second display data is released for executing Step S3 to process the second display data of the second display portion 102 according to the second combined statistical information.

Based on Step S6 and relevant context above, Step S3 can be completed after the time corresponding to N rows, that is, the second display data is released after the time corresponding to N rows so as to be processed by the second combined statistical information to obtain the second target display data.

In an embodiment, as shown in FIG. 4, before Step S1, the method may include, but is not limited to, the following steps.

S701: by the first timing controller, obtaining and transmitting the first row statistical information to the second timing controller within the time corresponding to N rows.

Specifically, with reference to the above context regarding Step S1, the first combined statistical information is obtained by combining the first statistical information corresponding to the first display data with the second statistical information corresponding to the second display portion 102. Accordingly, before this step, the first row statistical information may be obtained within the time corresponding to N rows. Meanwhile, with reference to the above context regarding Step S3, considering that the second combined statistical information is also obtained by combining the first statistical information corresponding to the first display data with the second statistical information corresponding to the second display portion 102, it also needs to transmit the first row statistical information to the second timing controller 202 for the second timing controller 202 to obtain and use the same.

S702: by the first timing controller, receiving the second row statistical information transmitted by the second timing controller within the time corresponding to N rows.

Specifically, with reference to the above context regarding Step S1, the first combined statistical information is obtained by combining the first statistical information corresponding to the first display data and the second statistical information corresponding to the second display portion 102. Accordingly, it also needs the first timing controller 201 to receive the second row statistical information transmitted by the second timing controller 202 within the time corresponding to N rows so as to obtain the first combined information.

Likewise, before Step S3, the method may include, but is not limited to, the following steps.

S703: by the second timing controller, obtaining and transmitting the second row statistical information to the first timing controller within the time corresponding to N rows.

Specifically, reference may be made to relevant description in Step S701 above.

S704: by the second timing controller, receiving the first row statistical information transmitted by the first timing controller within the time corresponding to N rows.

Specifically, reference may be made to relevant description in Step S702 above.

In an embodiment, as shown in FIG. 1, the first display portion 101 and the second display portion 102 include a plurality of first subpixels 01 and a plurality of second subpixels 02 arranged in a same row, respectively. The first display data includes a first current frame display data corresponding to the plurality of first subpixels 01, and the second display data includes a second current frame display data corresponding to the plurality of second subpixels 02. The first statistical information includes a first previous frame statistical information corresponding to a first previous frame display data of the plurality of first subpixels 01, and the second statistical information includes a second previous frame statistical information corresponding to a second previous frame display data of the plurality of second subpixels 02.

Specifically, with reference to the above context, in this embodiment, the specific positions of the first display portion 101 and the second display portion 102 are not limited, but the first display data and the second display data are further defined as the first current frame display data of the plurality of first subpixels 01 in the first display portion 101 and the second current frame display data of the plurality of second subpixels 02 in the second display portion 102, respectively. Also, the first statistical information is obtained by combining the first previous frame statistical information corresponding to the plurality of first subpixels 01 of the first display portion 101 with the second previous frame statistical information corresponding to the plurality of second subpixels 02 of the second display portion 102, and the second statistical information is also obtained by combining the first previous frame statistical information corresponding to the plurality of first subpixels 01 of the first display portion 101 with the second previous frame statistical information corresponding to the plurality of second subpixels 02 of the second display portion 102. As mentioned above, the two ways of "combining" may be the same or different from each other.

Therefore, with reference to above context, in this embodiment, a first target current frame display data (essentially, the first target display data) used to drive the plurality of first subpixels 01 to display a picture and the second target current frame display data (essentially, the second target display data) used to drive the plurality of second subpixels 02 to display a picture all have taken into account the first previous frame statistical information and the second previous frame statistical information, that is, in the current frame, the displaying made by the second display portion 102 may have a certain correlation with the displaying made by the first display portion 101, thereby increasing the consistency in time and space between the picture displayed by the first display portion 101 and the picture displayed by the second display portion 102 in the current frame (with respect to the picture displayed by the first display portion 101 and the picture displayed by the second display portion 102 in the previous frame).

In an embodiment, there is a same blanking period between a first previous frame and a first current frame and between a second previous frame and a second current frame, the first previous frame and the first current frame correspond to the first previous frame display data and the first current frame display data, respectively, and the second previous frame and the second current frame correspond to the second previous frame display data and the second current frame display data, respectively. Step S1 is finished after the blanking period, and Step S3 is finished after the blanking period. Specifically, since the first previous frame display data and the second previous frame display data are essentially the display data of the previous frame of the display panel 10 (which may be previous p frames, where p is a positive integer) and the first current frame display data and the second current frame display data are essentially the display data of the current frame (that is, this frame) of the display panel 10, there is a same blanking period between transmissions of the first previous frame display data and the first current frame display data and between transmissions of the second previous frame display data and the second current frame display data.

It can be understood that in this embodiment, based on the existence of the afore-mentioned blanking period, Step S1 and Step S3 can be executed after the blanking period, that is, a first target current frame display data (essentially, the first target display data) and a second target current frame display data (essentially, the second target display data) corresponding to the current frame can be obtained in the current frame after the blanking period so as to drive the first display portion 101 and the second display portion 102 to display pictures, respectively. This can avoid buffering the first previous frame display data and the second previous frame display data.

Figure 5:
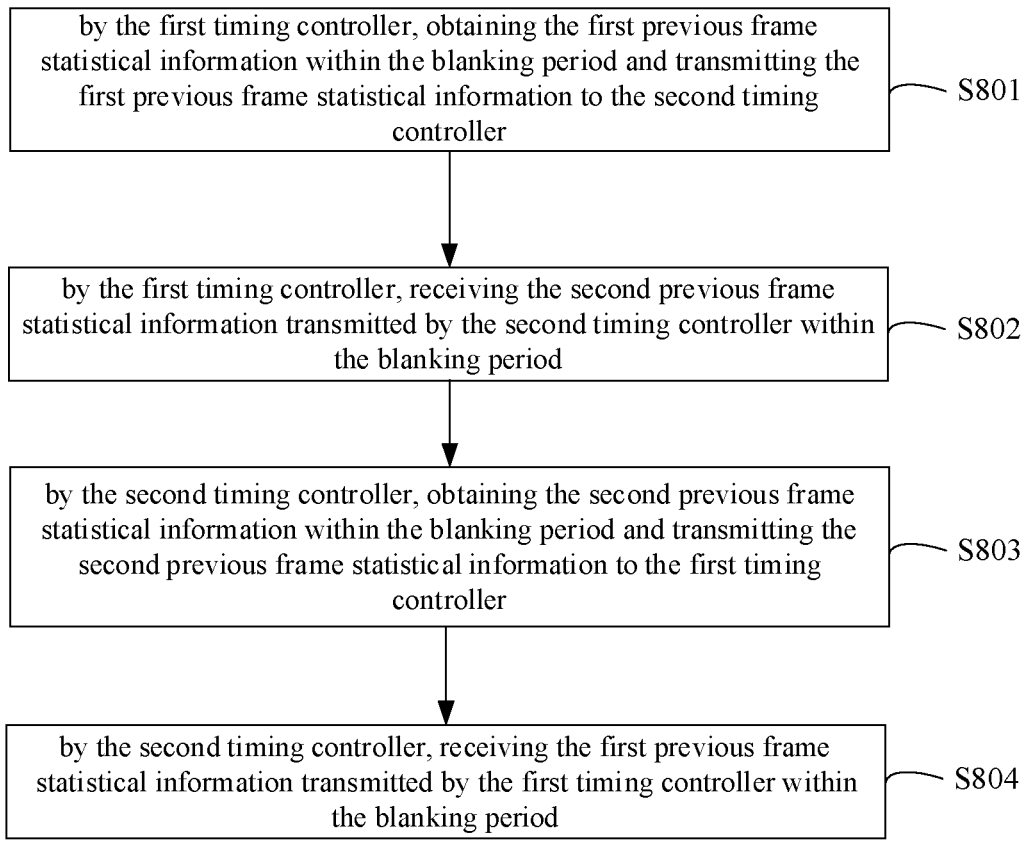

In an embodiment, as shown in FIG. 5, before Step S1, the method may include, but is not limited to, the following steps.

S801: by the first timing controller, obtaining the first previous frame statistical information within the blanking period and transmitting the first previous frame statistical information to the second timing controller.

Specifically, with reference to the above context regarding Step S1, the first combined statistical information is obtained by combining the first statistical information corresponding to the first display data with the second statistical information corresponding to the second display portion 102. Accordingly, before this step, the first previous frame statistical information can be obtained within the blanking period. Meanwhile, with reference to the above context regarding Step S3, considering that the second combined statistical information is also obtained by combining the first statistical information corresponding to the first display data with the second statistical information corresponding to the second display portion 102, it also needs to transmit the first previous frame statistical information to the second timing controller 202 for the second timing controller 202 to obtain and use the same.

S802: by the first timing controller, receiving the second previous frame statistical information transmitted by the second timing controller within the blanking period.

Specifically, with reference to the above context regarding Step S1, the first combined statistical information is obtained by combining the first statistical information corresponding to the first display data and the second statistical information corresponding to the second display portion 102. Accordingly, it also needs the first timing controller 201 to receive the second previous frame statistical information transmitted by the second timing controller 202 within the blanking period so as to obtain the first combined information.

Likewise, before Step S3, the method may include, but is not limited to, the following steps.

S803: by the second timing controller, obtaining the second previous frame statistical information within the blanking period and transmitting the second previous frame statistical information to the first timing controller.

Specifically, reference may be made to relevant description in Step S801 above.

S804: by the second timing controller, receiving the first previous frame statistical information transmitted by the first timing controller within the blanking period.

Specifically, reference may be made to relevant description in Step S802 above.

The embodiment of the present invention provides a display panel, which includes, but is not limited to, the following embodiments and any combination of the following embodiments.

In an embodiment, as shown in FIG. 1, the display panel 10 includes the first display portion 101, the second display portion 102, and the first timing controller 201 and the second timing controller 202 electrically connected to the first display portion 101 and the second display portion 102, respectively, that is, the first timing controller 201 is electrically connected to the first display portion 101, and the second timing controller 202 is electrically connected to the second display portion 102. Further, referring to FIGS. 1, 2 and 6-8, the first timing controller 201 includes a first processing module 2011, for processing a first display data of the first display portion 101 according to a first combined statistical information to obtain a first target display data, wherein the first combined statistical information is obtained by combining a first statistical information corresponding to the first display data with a second statistical information corresponding to the second display portion 102; and a first driving module 2012, for driving the first display portion 101 to display a picture according to the first target display data, and the second timing controller includes a second processing module 2021, for processing a second display data of the second display portion 102 according to a second combined statistical information to obtain a second target display data, wherein the second combined statistical information is obtained by combining the first statistical information corresponding to the first display data with the second statistical information corresponding to the second display portion 102; and a second driving module 2022, for driving the second display portion 102 to display a picture according to the second target display data.

The ways to communicate between any two of the first processing module 2011, the first driving module 2012, the second processing module 2021 and the second driving module 2022 are not limited in this embodiment as long as the above information can be communicated therebetween. Specifically, the first display portion 101, the second display portion 102, the first timing controller 201, the second timing controller 202, the first combined statistical information, the second combined statistical information, the first display data, the second display data, the first target display data, the second target display data, the first statistical information and the second statistical information may refer to relevant descriptions above.

Figure 6:
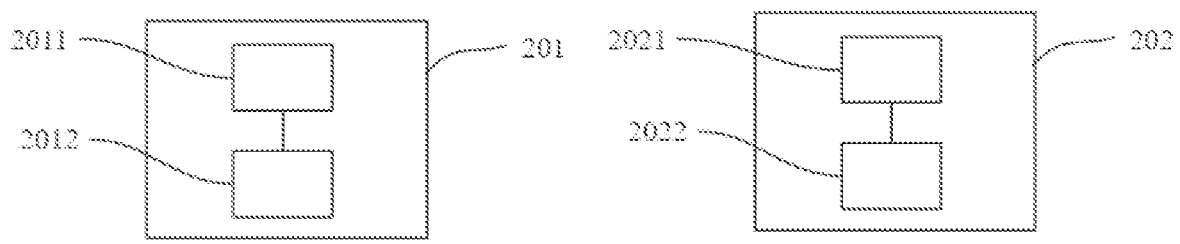
FIGS. 6 to 8 are structural block diagrams of a first timing controller and a second timing controller provided in the embodiments of the present invention.
Figure 7:
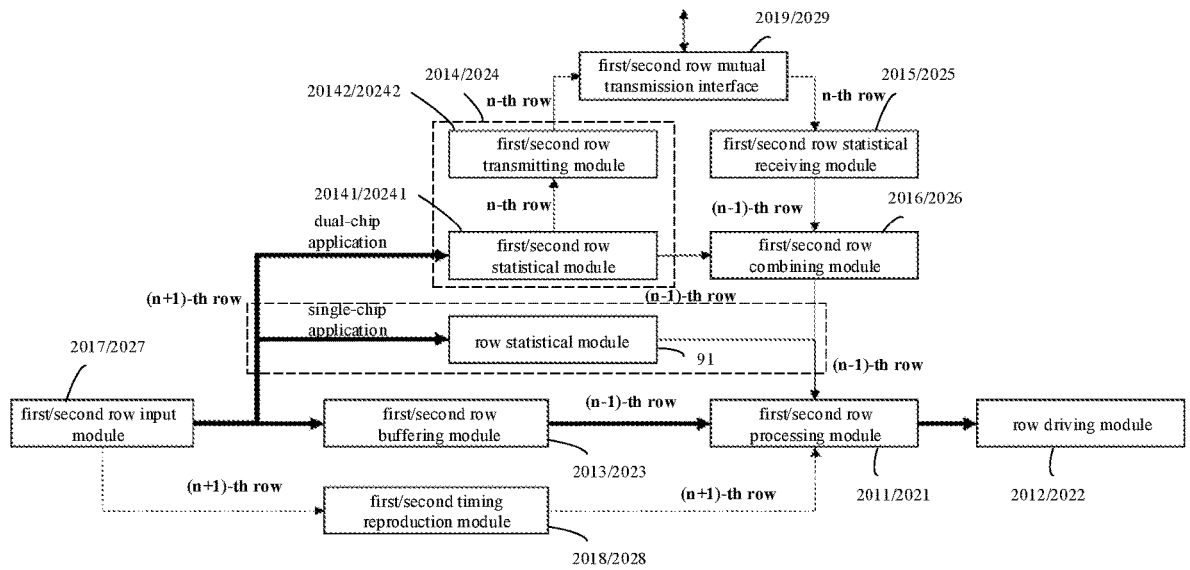

In an embodiment, as shown in FIG. 1, as described above, the first display portion 101 and the second display portion 102 are arranged adjacent to each other along a row direction D1. The first display portion 101 and the second display portion 102 include a plurality of first subpixels 01 and a plurality of second subpixels 02 arranged in a same row, respectively. The first display data includes a first row display data corresponding to the plurality of first subpixels 01, and the second display data includes a second row display data corresponding to the plurality of second subpixels 02. As shown in FIGS. 6 and 7, the first timing controller 201 further includes a first row buffering module 2013 for buffering the first row display data, and the second timing controller 202 further includes a second row buffering module 2023 for buffering the second row display data.

The ways to communicate between any two of the first row buffering module 2013, the second row buffering module 2023 and the aforesaid modules are not limited in this embodiment as long as the above information can be communicated therebetween. Specifically, the first row display data and the second row display data may also refer to relevant descriptions above.

Figure 8:
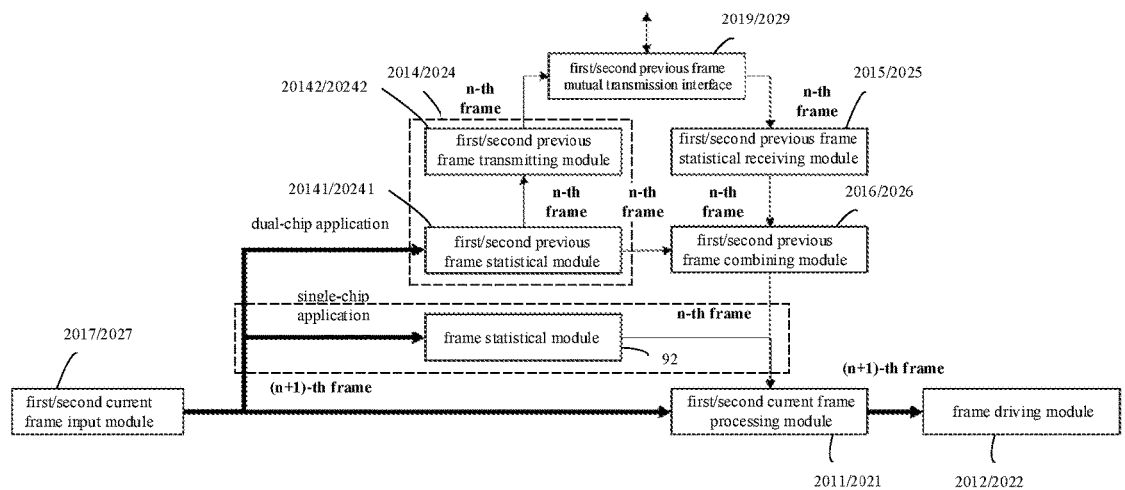

In an embodiment, as shown in FIGS. 6 to 8, the first timing controller 201 includes a first statistical transmitting module 2014 and a first statistical receiving module 2015, and the second timing controller 202 includes a second statistical transmitting module 2024 and a second statistical receiving module 2025. The first statistical transmitting module 2014 is used to transmit the first statistical information to the second statistical receiving module 2025, and the second statistical transmitting module 2024 is used to transmit the second statistical information to the first statistical receiving module 2015.

The ways to communicate between any two of the first statistical transmitting module 2014, the first statistical receiving module 2015, the second statistical transmitting module 2024, the second statistical receiving module 2025 and the aforesaid modules are not limited in this embodiment as long as the above information can be communicated therebetween. Specifically, the first statistical information may include, but is not limited to, the first row statistical information mentioned above, and correspondingly, the second statistical information may include, but is not limited to, the second row statistical information mentioned above; alternatively, the first statistical information may include, but is not limited to, the first previous frame statistical information mentioned above, and correspondingly, the second statistical information may include, but is not limited to, the second previous frame statistical information mentioned above.

In an embodiment, as shown in FIGS. 6 to 8, the first timing controller 201 further includes: a first combining module 2016, for combining the first statistical information and the second statistical information to obtain the first combined statistical information; the second timing controller 202 further includes: a second combining module 2026, for combining the first statistical information and the second statistical information to obtain the second combined statistical information.

The ways to communicate between any two of the first combining module 2016, the second combining module 2026 and the aforesaid modules are not limited in this embodiment as long as the above information can be communicated therebetween. Specifically, the first combined statistical information can be obtained by combining the first row statistical information and the second row statistical information, and the second combined statistical information can also be obtained by combining the first row statistical information and the second row statistical information; alternatively, the first combined statistical information can be obtained by combining the first previous frame statistical information and the second previous frame statistical information, and the second combined statistical information can also be obtained by combining the first previous frame statistical information and the second previous frame statistical information.

As shown in FIG. 7 and FIG. 8, the first/second timing controller 201/202 may further include a first/second input module 2017/2027 and a first/second mutual transmission interface 2019/2029.

Specifically, for the mutual transmission scheme of row statistical information, as shown in FIG. 7, the first/second display data input module 2017/2027 can be a first/second row input module essentially, that is, it can be used to input the first/second row display data. The first/second statistical transmitting module 2014/2024 may include a first/second statistical module 20141/20241 and a first/second transmitting module 20142/20242. The first/second statistical module 20141/20241 can be a first/second row statistical module essentially, and the first/second transmitting module 20142/20242 can be a first/second row transmitting module. The first/second timing controller 201/202 can also include a first/second timing reproduction module 2018/2028. The first/second statistical receiving module 2015/2025 can be a first/second row statistical receiving module essentially. The first/second combining module 2016/2026 can be a first/second row combining module.

Based on this, in the mutual transmission scheme of row statistical information (for dual-chip applications), as shown in FIG. 7, the first display portion 101 and the second display portion 102 are arranged to be adjacent to each other along a row direction D1, and the first display portion 101 and the second display portion 102 include a plurality of first subpixels 01 and a plurality of second subpixels 02, respectively. Herein, it is illustrated only by the first timing controller 201 as an example. When a half of display data (the first row display data) in the (n+1)-th row display data is input via the first row input module (included in the first input module 2017), on the one hand, it is buffered in a half of the space in the first row buffering module 2013; on the other hand, it is transmitted to the first row statistical module (included in the first statistical module 20141). Meanwhile, the first row statistical module (included in the first statistical module 20141) determines a corresponding first row statistical information according to the first row display data of the n-th row display data, and the first row statistical information is transmitted to the second timing controller 202 via the first row transmitting module (included in the first transmitting module 20142) and a first mutual transmission interface 2019. Meanwhile, the second timing controller 202 also transmits a corresponding second row statistical information determined according to another half of the display data (the second row display data) of the n-th row display data to the first statistical receiving module 2015 via the first mutual transmission interface 2019. Meanwhile, the first row buffering module 2013 releases a half of the display data (the first row display data) in the (n−1)-th row display data to a first row processing module (included in the first processing module 2011), and the first combining module 2016 can obtain the second row statistical information and the first row statistical information from the first statistical receiving module 2015 and the first row statistical information (included in the first statistical module 20141), respectively, and combine them to generate the first combined statistical information corresponding to the (n−1)-th row display data, and transmit it to the first row processing module (included in the first processing module 2011) for the first row processing module (included in the first processing module 2011) to process the first display data by using the first combined statistical information to generate the first target display data for a row driving module (included in the first driving module 2012). n is a positive integer greater than or equal to 2.

It can be understood that the first row display data stored by the first row buffering module 2013 will only use a half of inherent capacity, and the remaining capacity can be used to store the data of next row, so that the time approximately corresponding to one row can be obtained for the exchange of row statistical information. The first timing reproduction module 2018 can be used to ensure that the timing of video output by the first row buffering module 2013 is consistent with that of input, and only the time corresponding to two rows is delayed, and N in "the time corresponding to N rows" mentioned above can be equal to 2.

Of course, in a single-chip application (only the first timing controller 201 or the second timing controller 202 exists), since there are no operations such as row transmission, row mutual transmission, row statistical transmission, row combination and row processing, it can use the row buffering module to replace the first row buffering module 2013 in FIG. 7. The row buffering module can store an entire row of display data. It can use the row statistical module to determine a statistical information corresponding to the entire row of display data. Accordingly, the output of the row buffering module can be delayed by an entire row as compared with the input, and this delay can be achieved by the timing reproduction module.

Specifically, for the mutual transmission scheme of frame statistical information, as shown in FIG. 8, the first/second display data input module 2017/2027 can be a first/second current frame input module essentially, that is, it can be used to input the first/second current frame display data. The first/second statistical transmitting module 2014/2024 may include a first/second statistical module 20141/20241 and a first/second transmitting module 20142/20242. The first/second statistical module 20141/20241 can be a first/second previous frame statistical module essentially, and the first/second transmitting module 20142/20242 can be a first/second previous frame transmitting module. The first/second statistical receiving module 2015/2025 can be a first/second previous frame statistical receiving module essentially. The first/second combining module 2016/2026 can be a first/second previous frame combining module.

Based on this, in the mutual transmission scheme of frame statistical information (for dual-chip applications), as shown in FIG. 8, herein, it is illustrated only by the first timing controller 201 as an example. When a half of display data (the first current frame display data) in the (n+1)-th frame (the current frame) display data is input via the first current frame input module (included in the first input module 2017), on the one hand, it is directly transmitted to the first/second current frame processing module (included in the first processing module 2011); on the other hand, it is transmitted to the first previous frame statistical module (included in the first statistical module 20141). Meanwhile, the first previous frame statistical module (included in the first statistical module 20141) determines a corresponding first previous frame statistical information according to the first previous frame display data of the n-th frame (the previous frame) display data, and the first previous frame statistical information is transmitted to the second timing controller 202 via the first previous frame transmitting module (included in the first transmitting module 20142) and a first mutual transmission interface 2019. Meanwhile, the second timing controller 202 also transmits a corresponding second previous frame statistical information determined according to the second previous frame display data (the second row display data) of the n-th frame (the previous frame) display data to the first previous frame combining module (included in the first combining module 2016) via the first previous frame receiving module (included in the first statistical receiving module 2015) and the first mutual transmission interface 2019. The first previous frame statistical module (included in the first statistical module 20141) also transmits the first previous frame statistical information to the first previous frame combining module (included in the first combining module 2016). Meanwhile, the first previous frame combining module (included in the first combining module 2016) combines the second previous frame statistical information with the second previous frame statistical information to obtain the first (previous frame) combined statistical information. Meanwhile, the first current frame processing module (included in the first processing module 2011) uses the first previous frame (the n-th frame) combined statistical information to process the first current frame (the (n+1)-th frame) display data to generate a first current frame target display data for the frame driving module (included in the first driving module 2012). n is a positive integer greater than or equal to 2.

It can be understood that the mutual transmission of frame statistical information can be executed during the blanking period between the previous frame and the current frame without a need to deploy a frame buffer module, so the first current frame display data can be processed according to the first (the previous frame) combined statistical information of the previous frame.

Likewise, in a single-chip application (only the first timing controller 201 or the second timing controller 202 exists), since there are no operations such as row transmission, row mutual transmission, row statistical transmission, row combination and row processing, it can use the row statistical module to determine a statistical information corresponding to an entire frame of display data for a corresponding blanking period without a need to deploy a frame buffering module.

The afore-mentioned display panel driving method can be realized by adopting at least one corresponding structure in FIG. 7 and FIG. 8.

The present invention provides a display panel and a driving method thereof. By the first combined statistical information obtained by combining the first statistical information corresponding to the first display data with the second statistical information corresponding to the second display portion, the first display data of the first display portion is processed to obtain the first target display data used to drive the first display portion, and by the second combined statistical information obtained by combining the first statistical information corresponding to the first display data with the second statistical information corresponding to the second display portion, the second display data of the second display portion is processed to obtain the second target display data used to drive the second display portion. In this way, the displaying made by the first display portion and the displaying made by the second display portion take all the first statistical information and the second statistical information into consideration, so that the two displayed pictures have a certain correlation with each other, thereby increasing the consistency between the pictures displayed by the first display portion and the second display portion.

Hereinbefore, the display panel and the driving method thereof provided in the embodiments of the present invention are introduced in detail, the principles and implementations of the present invention are set forth herein with reference to specific examples, descriptions of the above embodiments are merely served to assist in understanding the technical solutions and essential ideas of the present invention. Those having ordinary skill in the art should understand that they still can modify technical solutions recited in the aforesaid embodiments or equivalently replace partial technical features therein; these modifications or substitutions do not make essence of corresponding technical solutions depart from the scope of technical solutions of embodiments of the present invention.

What is claimed is:

1. A display panel driving method, for driving a display panel, the display panel comprising a first display portion, a second display portion, a first timing controller electrically connected to the first display portion, and a second timing controller electrically connected to the second display portion, the method comprising:

by the first timing controller, processing a first display data of the first display portion according to a first combined statistical information to obtain a first target display data, wherein the first combined statistical information is obtained by combining a first statistical information corresponding to the first display data with a second statistical information corresponding to the second display portion;

by the first timing controller, driving the first display portion to display a picture according to the first target display data;

by the second timing controller, processing a second display data of the second display portion according to a second combined statistical information to obtain a second target display data, wherein the second combined statistical information is obtained by combining the first statistical information corresponding to the first display data with the second statistical information corresponding to the second display portion; and by the second timing controller, driving the second display portion to display a picture according to the second target display data;

wherein the first display portion and the second display portion comprise a plurality of first subpixels and a plurality of second subpixels arranged in a same row, respectively, wherein the first display data comprises a first current frame display data corresponding to the plurality of first subpixels, and the second display data comprises a second current frame display data corresponding to the plurality of second subpixels, wherein the first statistical information comprises a first previous frame statistical information, the first previous frame statistical information corresponds to the first previous frame statistical information of a first previous frame display data of the plurality of first subpixels, the second statistical information comprises a second previous frame statistical information, and the second previous frame statistical information corresponds to the second previous frame statistical information of a second previous frame display data of the plurality of second subpixels;

wherein there is a same blanking period between a first previous frame and a first current frame and between a second previous frame and a second current frame, the first previous frame and the first current frame correspond to the first previous frame display data and the first current frame display data, respectively, and the second previous frame and the second current frame correspond to the second previous frame display data and the second current frame display data, respectively, wherein the processing, by the first timing controller, the first display data of the first display portion according to the first combined statistical information to obtain the first target display data is finished after the blanking period, wherein the processing, by the second timing controller, the second display data of the second display portion according to the second combined statistical information to obtain the second target display data is finished after the blanking period.

2. The display panel driving method according to claim 1, wherein the first display portion and the second display portion are arranged adjacent to each other along a row direction, wherein the first display data comprises a first row display data corresponding to the plurality of first subpixels, and the second display data comprises a second row display data corresponding to the plurality of second subpixels, wherein the first statistical information comprises a first row statistical information corresponding to the first row display data, and the second statistical information comprises a second row statistical information corresponding to the second row display data.

3. The display panel driving method according to claim 2, wherein before the processing, by the first timing controller, the first display data of the first display portion according to the first combined statistical information to obtain the first target display data, the method comprises:

by the first timing controller, buffering the first display data for the time corresponding to N rows, where N is a positive integer;

wherein before the processing, by the second timing controller, the second display data of the second display portion according to the second combined statistical information to obtain the second target display data, the method comprises:

by the second timing controller, buffering the second display data for the time corresponding to N rows.

4. The display panel driving method according to claim 3, wherein before the processing, by the first timing controller, the first display data of the first display portion according to the first combined statistical information to obtain the first target display data, the method comprises:

by the first timing controller, obtaining and transmitting the first row statistical information to the second timing controller within the time corresponding to N rows; and by the first timing controller, receiving the second row statistical information transmitted by the second timing controller within the time corresponding to N rows, wherein before the processing, by the second timing controller, the second display data of the second display portion according to the second combined statistical information to obtain the second target display data, the method comprises:

by the second timing controller, obtaining and transmitting the second row statistical information to the first timing controller within the time corresponding to N rows; and by the second timing controller, receiving the first row statistical information transmitted by the first timing controller within the time corresponding to N rows.

5. The display panel driving method according to claim 1, wherein before the processing, by the first timing controller, the first display data of the first display portion according to the first combined statistical information to obtain the first target display data, the method comprises:

by the first timing controller, obtaining the first previous frame statistical information within the blanking period and transmitting the first previous frame statistical information to the second timing controller; and by the first timing controller, receiving the second previous frame statistical information transmitted by the second timing controller within the blanking period;

wherein before the processing, by the second timing controller, the second display data of the second display portion according to the second combined statistical information to obtain the second target display data, the method comprises:

by the second timing controller, obtaining the second previous frame statistical information within the blanking period and transmitting the second previous frame statistical information to the first timing controller; and by the second timing controller, receiving the first previous frame statistical information transmitted by the first timing controller within the blanking period.

\* \* \* \* \*